Figure 1:
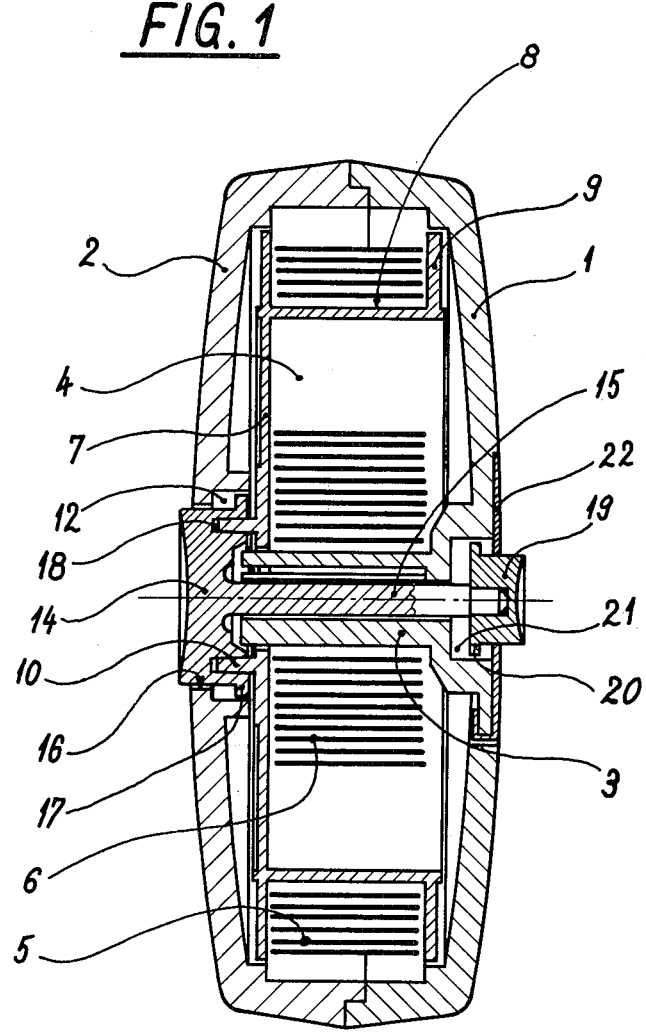

United States Patent [19]

Quenot

[11] 4,121,785

[45] Oct. 24, 1978

[54] TAPE MEASURE BRAKE

[75] Inventor: Michel Quenot, Besancon, France

[73] Assignee: Stanley-Mabo S.A., Besancon, France

[21] Appl. No.: 774,926

[22] Filed: Mar. 7, 1977

[30] Foreign Application Priority Data

Mar. 18, 1976 [FR] France .................. 76 08605

[51] Int. Cl.² .................. B65H 75/48; G01B 3/10
[52] U.S. Cl. .................. 242/84.8; 33/138; 242/99; 242/107.3
[58] Field of Search .......... 242/84.8, 107.3, 107.6, 242/99, 84.5 R, 84.5 A, 84.51 A, 84.21 R, 84.53, 156, 107.4 R; 33/138

[56] References Cited

U.S. PATENT DOCUMENTS

| | | | |
|---|---|---|---|
| 951,548 | 3/1910 | Rhoades | 242/156 |
| 2,481,638 | 9/1949 | Borup | 242/107.3 X |
| 2,518,902 | 8/1950 | King | 242/107.3 |
| 2,598,596 | 5/1952 | Petrie | 242/107.6 |
| 2,758,801 | 8/1956 | Bonanno | 242/84.21 R |
| 3,114,515 | 12/1963 | Kane | 242/107.3 |
| 3,224,706 | 12/1965 | Bastow | 242/107.6 X |
| 3,640,363 | 2/1972 | Spalding | 242/107.3 X |

*Primary Examiner*—Harvey C. Hornsby
*Assistant Examiner*—John M. Jillions
*Attorney, Agent, or Firm*—Prutzman, Kalb, Chilton & Alix

[57] ABSTRACT

An on-off brake for the winding drum of an encased tape rule comprises a double-headed non-rotatable push-button movable along the drum axis to and from a braking position in which a conical projection on the drum tightly frictionally engages a corresponding conical groove in one push-button.

6 Claims, 2 Drawing Figures

TAPE MEASURE BRAKE

The invention relates to tape rules and the like linear measuring instruments including a casing in which is rotatably mounted a tape winding drum preferably having a return spring, and a device for locking the drum and consequently the tape.

Apart from devices which act directly on the tape and have the disadvantage of causing wear of the tape, there are known devices which brake or lock the drum without coming into contact with the tape. These locking devices have the advantage of not deteriorating the tape and are employed in instances when it is not necessary to stop the tape in a very precise manner. In effect, locking of the drum does not produce immediate locking of the tape which may still wind slightly under the action of the return spring or be slightly unwound with a tightening of the winds of the coil. Such a locking of the drum without directly acting on the tape is quite satisfactory for many types of linear measuring instruments and avoids the drum unwantedly turning, in particular under the action of the return spring during a measuring operation.

There are several known types of mechanism for braking or locking the drum; apart from frame tape-measures provided with a crank that can be rigidly coupled to the drum and locked, one has already used springs mounted in the casing acting on the drum and which, under a given pressure, exert a permanent friction on the drum. Another known locking device is formed by a toothing fixed (or integral) with the drum and a pawl by means of which the drum may be stopped in one direction or both directions, but this mechanism only enables a step-by-step stopping and is of relatively complicated construction.

The invention proposes to provide a locking device for the winding drum of a linear measuring instrument which enables, with a reduced bulk, an efficient braking and which has the advantage of being simple, cheap, of reliable operation and practical to handle.

To this end, the locking device of a tape rule or the like linear measuring instrument according to the invention comprises a push button mounted in a central orifice of the casing adjacent a face of the tape winding drum, one of the push button and the adjacent face of the drum having a circular recess concentric to the axis of rotation of the drum and the other a complementary circular projection facing the recess, the push button being axially movable between a locking position in which the projection engages the recess to lock the drum and an unlocking position in which the projection is disengaged from the recess.

In this manner, one provides an occasional-type braking of the drum, i.e. the drum is normally free and, when a tape return spring is provided, rewinding of the tape in the casing is automatic unless the user presses on the braking button. It has been observed that the automatic rewinding of the tape is in general considered important by the user; the brake is not normally employed during a measuring operation, but only in particular instances for example when calculations or notations are to be made.

According to a preferred characteristic of the invention, the projection is an outwardly-projecting annular collar on the drum with tapering generally conical walls, and the recess is a complementary groove in the button.

The conicity of the walls of the collar and of the groove is preferably from 2° to 5°.

Advantageously, the winding drum is rotatably mounted on a hollow axle of the casing, the push button being extended by a rod passing through said axle and having, in a central orifice in the other side of the casing, an actuating button for moving said push button from the locking position to the unlocking position.

One hence obtains a compact instrument provided with a simple and efficient occasional braking device having two stable positions enabling locking of the tape with a desired force in any position of the drum whatsoever, as well as unlocking thereof.

Figure 2:
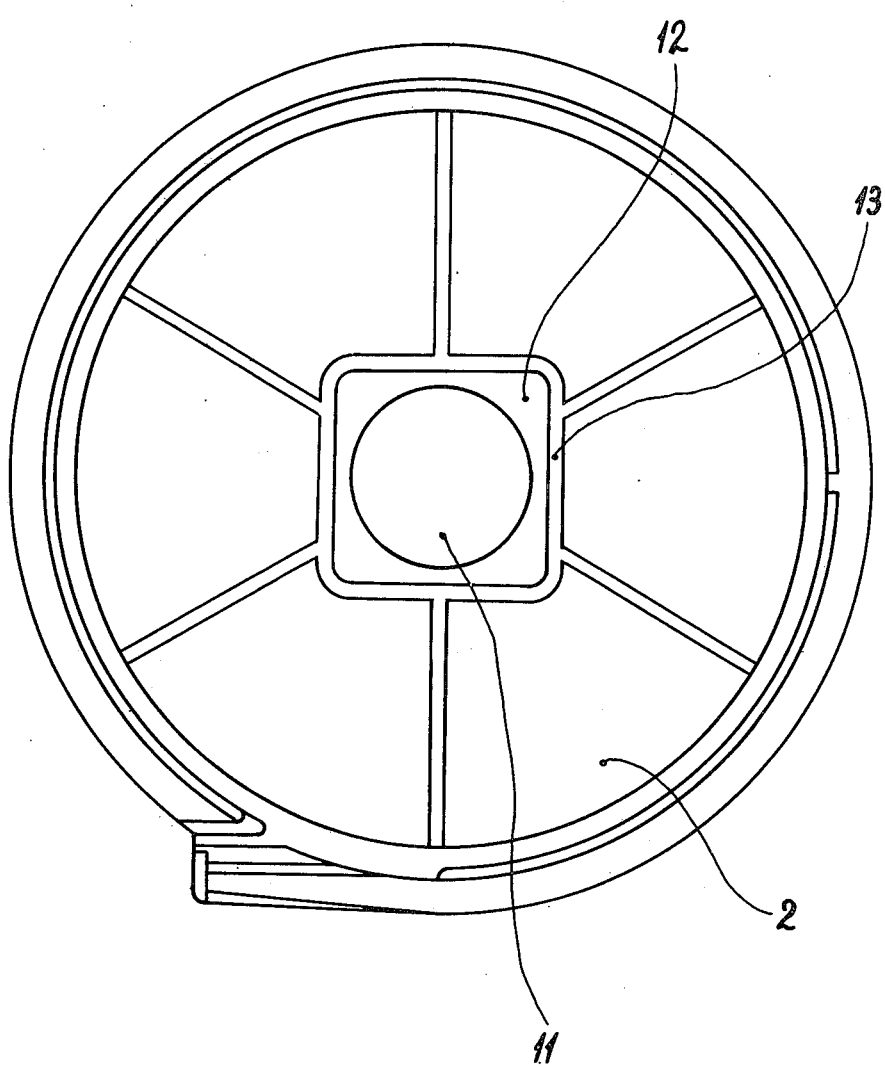

An embodiment of the invention will be described, by way of example, with reference to the accompanying drawings, in which:

FIG. 1 is an axial cross-section of a tape rule with its braking device in an operative braking position; and FIG. 2 is an elevational view of the inner face of part of the tape rule casing.

The tape rule shown comprises a casing formed of two shells, a male shell 1 and a female shell 2. On its inner face, the male shell 1 has an integral hollow central axle 3 and on which pivots a winding drum 4 of measuring tape 5. The winding drum 4 is formed of a lateral circular flange 7 from an inner face of which protrudes a drum-forming cylindrical ring 8 whose diameter is less than the diameter of the flange 7 and on which the measuring tape 5 is wound. The tape 5 is retained laterally between a peripheral flange 9 formed on the ring 8, and the outer edge of flange 7. A tape-return spring 6 is fixed inside the ring 8 in the usual manner.

The outwardly-directed face of the winding-drum flange 7 is provided with an annular collar 10 concentric to the axis of rotation and whose walls are slightly conical, the angle of conicity being for example of the order of 2° to 5°.

The female shell 2 is provided with a circular axial orifice 11 (FIG. 2) and on its inner face is formed a square recess 12 disposed about the orifice 11 and limited by walls 13 which project from said inner face.

A push-button 14 is extended by a rod 15 passing freely through the hollow axle 3 of shell 1 and projecting slightly from the outer face of the shell 1.

The push-button 14 has a head formed by a circular part 16 of a diameter slightly less than the diameter of the axial orifice 11 of shell 2 in a manner to be able to freely pass through this orifice, and a shoulder-forming square part 17 which is held against rotation in the square recess 12 of shell 2.

In the face of the head of button 14 directed towards the casing is a conical annular groove 18 of slight conicity and which corresponds to the conical collar 10 of the winding-drum flange 7. On the free end of the rod 15 of button 14 which slightly protrudes from the casing is fitted a cylindrical unlocking button 19 having a shoulder 20 and which is partially received in a corresponding housing 21 in the outer face of the male shell 1.

The outer face of the male shell 1 is also provided with a recess receiving a plate 22, for example of metal, which serves as a protective concealment and possibly carries inscriptions, this plate 22 having a circular opening which allows passage of the cylindrical part of button 19 but retains its shoulder 20.

In the locking position, shown in FIG. 1, the push-button 14 is pressed in and consequently the conical collar 10 of flange 7 is tightly fitted in the corresponding groove 18 of button 2. The slight conicity of the walls of the collar and of the groove and the choice of the material forming these parts, notably nylon or Delrin (Trade Mark), ensure that the frictional forces are largely sufficient to permit an efficient locking together of these two parts. In this position, any rotation of the winding drum 4 is prevented because the drum 4 is tightly held with the push-button 14 which itself is held against rotation relative to the casing by cooperation of its square shoulder 17 with the corresponding square housing 12 of shell 2.

To unlock the device, it suffices to press out the push-button 14, by pressing in the unlocking button 19 which pushes the rod 15 of the button 14 and disengages the conical collar 10 of the flange 7 from the corresponding groove 18 of button 14. When the conical walls are no longer in contact, the winding drum 4 is once more free to rotate and the tape 5 may be pulled out of or rewound into the casing.

The locking device thus has two stable positions, an unlocking position in which the drum is entirely free and consequently the tape 5 can be withdrawn or rewound at will, and a locking position which enables, at any moment, locking of the drum in any position whatsoever, with the tape 5 withdrawn or retracted.

The invention is not limited to the described embodiment. It is possible notably to replace the conical-walled collar by a trunco-conical projection concentric to the axis of rotation and which cooperates with a corresponding recess of the push-button. Alternatively, a conical projection could be provided on the button and cooperate with a conical recess in the drum. The push-button may also have other shapes and need not be provided with a rod passing through the axle defining the axis of rotation of the winding drum. For example, a button may be retained axially in the casing between two stops and provided on its inner face with a recess corresponding to a projection of the drum, this button being movable between a locking position in which it fits on the projection and an unlocking position in which it is disengaged from the projection. The unlocking button 19 can be eliminated by an arrangement whereby unlocking is obtained simply by exerting a traction on the tape in the direction tending to extract it from the casing.

What is claimed is:

1. A tape rule or the like linear measuring instrument including a casing having a central orifice, a tape winding drum rotatably mounted in the casing about an axis of rotation, and a drum locking device; said drum locking device comprising a push button non-rotatably mounted by the casing in the central orifice thereof adjacent a face of the drum, one of the push button and the adjacent face of the drum having a circular recess concentric with said axis comprising at least one radially rigid conical wall and the other of the push button and the adjacent face of the drum having a complementary mating projection comprising at least one radially rigid conical wall facing the recess, the push button being axially movable between a locking position in which the conical wall of the projection frictionally engages the conical wall of the recess to lock the drum and an unlocking position in which the projection is disengaged from the wall of the recess.

2. An instrument according to claim 1, in which the projection is an outwardly-projecting annular collar with tapering generally conical walls formed on the tape winding drum, and the recess is a complementary groove formed on the push button.

3. An instrument according to claim 2, in which the walls of the collar and groove are inclined at an angle of from 2° to 5° relative to the axis.

4. An instrument according to claim 1, in which the casing provides a hollow axle, the winding drum is rotatably mounted on the hollow axle, the push button has a rod passing through said axle, the casing further provides a central recess on the side of the casing opposite the push button, and an actuating button mounted in said central recess engages said rod for moving said push button from the locking position to the unlocking position.

5. An instrument according to claim 1, in which said push button is provided with a non-circular flange and the central orifice provides a mating recess to non-rotatably mount the push button.

6. An instrument according to claim 1, in which the conical walls have a taper angle which comprises a locking taper which automatically maintains the drum locking device in its locking position after it is moved to such position.

* * * * *